United States Patent [19]
Klement

[11] Patent Number: 5,782,593
[45] Date of Patent: Jul. 21, 1998

[54] DRIVE FOR MACHINING SPINDLE

[76] Inventor: Klaus-Dieter Klement, St.Mauri Strasse 1, D-52428 Jülich, Germany

[21] Appl. No.: 788,320

[22] Filed: Jan. 24, 1997

[30] Foreign Application Priority Data

Mar. 22, 1996 [DE] Germany ............... 196 11 459.4

[51] Int. Cl.$^6$ ................................................. B23C 1/00
[52] U.S. Cl. ................ 409/231; 408/124; 408/238; 475/298; 475/331
[58] Field of Search .................. 408/239 R, 238, 408/124; 409/231; 475/149, 153, 155, 298, 331, 299

[56] References Cited

U.S. PATENT DOCUMENTS

| 4,189,960 | 2/1980 | Holdeman | 475/298 |
|---|---|---|---|
| 4,483,128 | 11/1984 | Hawkins | 56/11.1 |
| 4,805,485 | 2/1989 | Ida | 475/298 |
| 5,006,100 | 4/1991 | Brandt et al. | 475/299 |
| 5,011,341 | 4/1991 | DeGroff | 408/124 |
| 5,083,990 | 1/1992 | Rahm | 475/263 |
| 5,339,908 | 8/1994 | Yokota et al. | 475/298 |

FOREIGN PATENT DOCUMENTS

| 8810092 | 11/1988 | Germany. |
|---|---|---|
| 4201849 | 1/1992 | Germany. |
| 42 01 849 | 12/1992 | Germany. |

Primary Examiner—Daniel W. Howell
Assistant Examiner—Christopher Kirkman
Attorney, Agent, or Firm—Herbert Dubno; Andrew Wilford

[57] ABSTRACT

A drive has a housing, a machining spindle rotatable in the housing about an axis and adapted to carry a machine tool, and a motor in the housing having a stator fixed in the housing and surrounding the spindle and a rotor rotatable about the axis relative to the housing and to the spindle and surrounding the spindle. A gear transmission in the housing has an input connectable to the rotor and an output connectable to the spindle for rotating the spindle about the axis. This transmission is displaceable between a low-speed position with a sun gear meshing with planet gears and a planet carrier coupled to the spindle for rotating the spindle at a rate slower than that of the rotor and a high-speed position with the sun gear out of mesh with the planet gears and directly coupled to the spindle for rotating the spindle jointly with the rotor.

5 Claims, 2 Drawing Sheets

DRIVE FOR MACHINING SPINDLE

FIELD OF THE INVENTION

The present invention relates to a machining spindle. More particularly this invention concerns a drive for rotating a machining spindle.

BACKGROUND OF THE INVENTION

A machining spindle rotatable in a housing about an axis and adapted to carry a machine tool is typically driven by an electric motor mounted right in the housing. This motor has a stator fixed in the housing and surrounding the spindle and a rotor rotatable about the axis relative to the housing, fixed to the spindle, and surrounding the spindle. Such an assembly is very simple, with the spindle in effect constituting the output shaft of the motor.

The disadvantage of this arrangement is that the spindle often cannot be rotated with sufficient torque. The torque the motor can apply to it is equal to its nominal rating, which is a function of coil size, electrical energy consumed, and several other factors. The main factor is typically how big a motor can be accommodated in the housing around the spindle.

It has been suggested to provide a step-down transmission between the motor and the shaft to increase the spindle drive torque. Such arrangements are invariable quite long, with a transmission at an inner end of the shaft and the motor offset axially inward therefrom. Furthermore in such arrangements the spindle cannot be driven at high speeds without generating considerable vibration, as the motor must then be rotated at a great rate so that, once this rate is stepped down by the transmission, the spindle speed is still fast enough.

OBJECTS OF THE INVENTION

It is therefore an object of the present invention to provide an improved drive for a machining spindle.

Another object is the provision of such an improved drive for a machining spindle which overcomes the above-given disadvantages, that is which is extremely compact yet which allows the motor speed to be stepped down to increase torque.

A further object is to provide such a drive which can be switched between a low-speed stepped-down mode to a high-speed direct-direct drive mode.

SUMMARY OF THE INVENTION

A drive has according to the invention a housing, a machining spindle rotatable in the housing about an axis and adapted to carry a machine tool, and a motor in the housing having a stator fixed in the housing and surrounding the spindle and a rotor rotatable about the axis relative to the housing and to the spindle and surrounding the spindle. A gear transmission in the housing has an input connectable to the rotor and an output connectable to the spindle for rotating the spindle about the axis. The spindle has an outer end provided with means for holding a tool and an inner end provided with the transmission. The motor is between the ends.

The transmission can be shifted between a low-speed position rotating the spindle at a rate slower than that of the rotor and a high-speed position rotating the spindle jointly with the rotor. To this end the transmission includes a tubular sun gear rotatable on the spindle and rotationally directly coupled to the rotor, a planet carrier rotatable about the axis and carrying a plurality of planet gears meshable with the sun gear, and a ring gear rotatable in the housing and meshing with the planet gears.

More specifically the transmission is displaceable between a low-speed position with the sun gear meshing with the planet gears and the planet carrier coupled to the spindle for rotating the spindle at a rate slower than that of the rotor and a high-speed position with the sun gear out of mesh with the planet gears and directly coupled to the spindle for rotating the spindle jointly with the rotor.

According to the invention the planet carrier with its gears is axially movable between high-speed and low-speed end positions. The housing and teeth on the planet carrier and on the shaft are axially engageable with each other only in the low-speed position, and teeth on the sun gear and on the spindle are axially engageable with each other only in the high-speed position.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
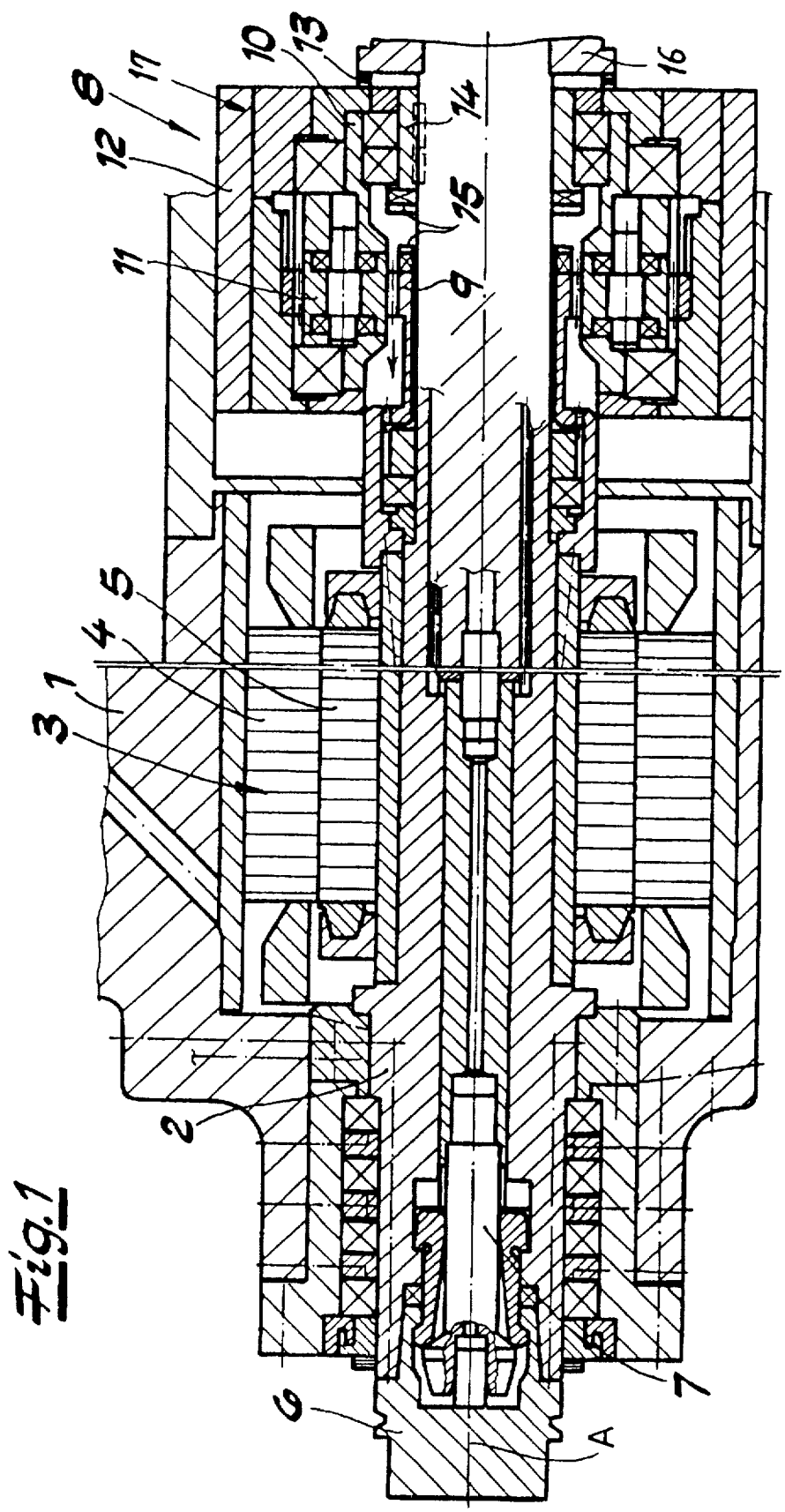
FIG. 1 is an axial section through a machining spindle according to the invention in the low-speed position.

As seen in the drawing, a housing 1 supports a drive spindle or shaft 2 for rotation about an axis A and holds a motor 3 comprising an annular stator 4 fixed in the housing 1 and an annular rotor 5 that coaxially surrounds the spindle 2, that can be coupled as described below to the spindle 2, but that is also rotatable relative to the spindle 2. An outer end of the spindle 2 is provided with a seat for receiving a tool holder 6 and a clamping device 7 as described in my copending U.S. patent applications is hydraulically actuatable to lock the holder 6 to the spindle 2.

The spindle 2 can be coupled to the rotor 5 by means of a planetary transmission 8 centered on the axis A and comprising a tubular sun gear or wheel 9, a planet carrier 10 with planet gears 11 meshable with the sun gear 9, and a free-floating ring gear 12 in continuous mesh with the planet gears 11. The sun gear 9 is rotationally and axially fixed to the rotor 5 but can rotate relative to the shaft 2. The ring gear 12 is coupled for joint limited axial movement with the planet carrier 10 and its gears 11 to form an assembly 17 movable between the axially offset positions shown in FIGS. 1 and 2.

According to the invention a collar 16 that is axially and rotationally fixed on the spindle 2 has teeth 3 meshable axially with identical teeth formed on the planet carrier 10 in the FIG. 1 low-speed position. In this position of the assembly 17 the sun gear 9 meshes with the planet gears 11 and the planet carrier 10 is rotationally coupled to the shaft 2 via the teeth 13 for a 4:1 stepdown, with the shaft 2 rotating at one-quarter the speed of the rotor 5.

Figure 2:
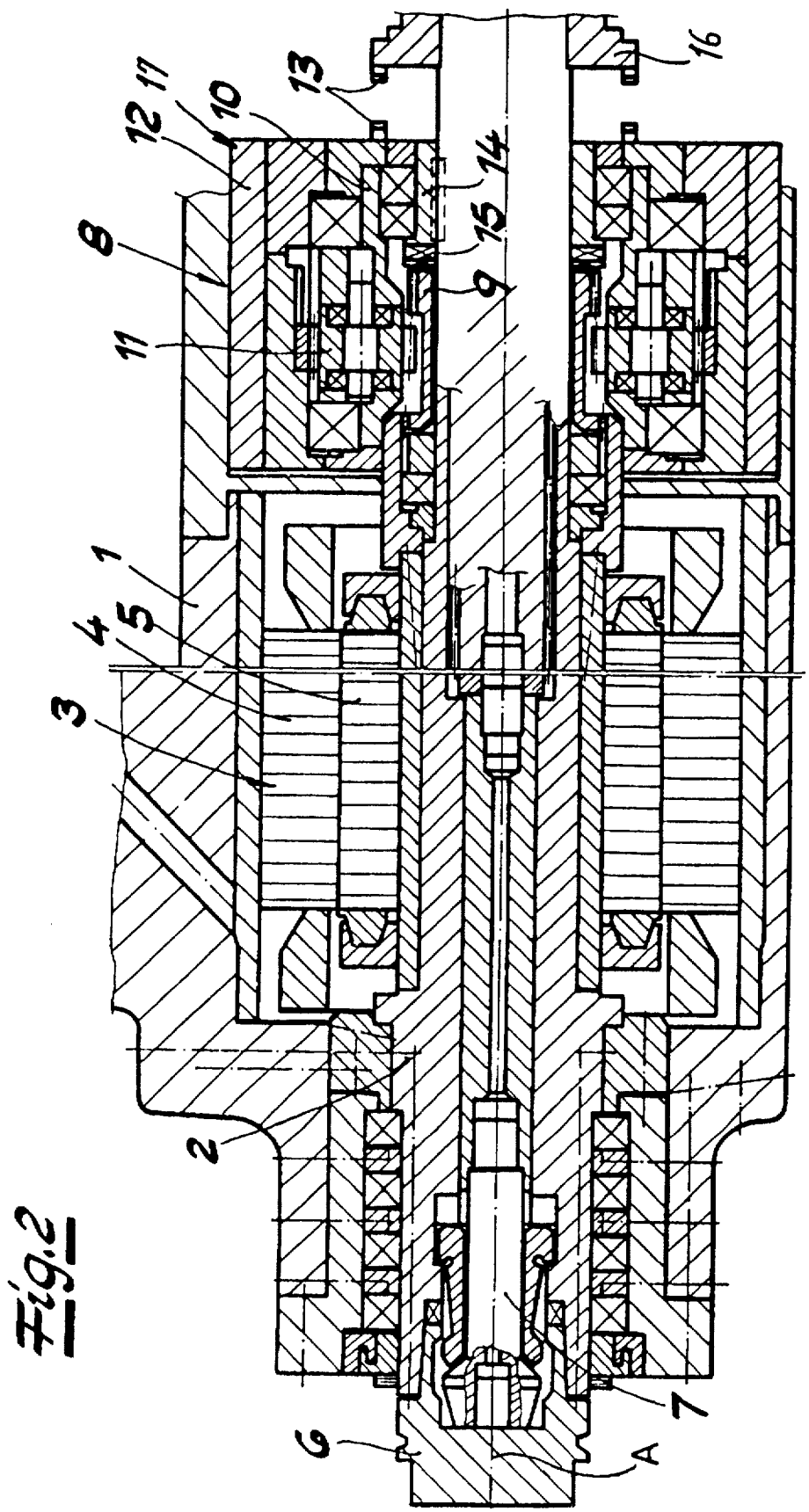
FIG. 2 is an axial section through the spindle in the high-speed position.

In the high-speed position of FIG. 2 the assembly 17 is pushed outward so that teeth 15 formed on a collar 14 fixed on the shaft 2 mesh with identical such teeth 15 on the axially inwardly directed end of the sun gear 9. In this position the sun gear 9 is out of mesh with the planet gears 11 but directly coupled via the teeth 15 to the shaft 2, so that the shaft 2 rotates at the same speed as, indeed jointly with, the rotor 5.

Thus it is possible with the system according to the invention, simply by shifting the position of the assembly 17 to move from a 4:1 reduction to a 1:1 straight drive. In the straight-drive position the entire assembly 17 is out of the force-transmission path altogether and can sit without rotating on the shaft 2 in the housing 1. Thus when a step down is needed, one is available, but in the high-speed low-torque position the transmission 8 is decoupled and the system operates quietly.

I claim:

1. A drive comprising:

a housing;

a machining spindle rotatable in the housing about an axis and adapted to carry a machine tool;

a motor in the housing having
- a stator fixed in the housing and surrounding the spindle, and
- a rotor rotatable about the axis relative to the housing and to the spindle and surrounding the spindle; and means including a gear transmission in the housing having an input connectable to the rotor and an output connectable to the spindle for rotating the spindle about the axis, the transmission including
- a tubular sun gear rotatable on the spindle and rotationally directly coupled to the rotor,
- a planet carrier rotatable about the axis and carrying a plurality of planet gears meshable with the sun gear, and
- a ring gear rotatable in the housing and meshing with the planet gears.

the transmission being displaceable between a low-speed position with the sun gear meshing with the planet gears and the planet carrier coupled to the spindle for rotating the spindle at a rate slower than that of the rotor and a high-speed position with the sun gear out of mesh with the planet gears and directly coupled to the spindle for rotating the spindle jointly with the rotor.

2. The machining spindle drive defined in claim 1 wherein the spindle has an outer end provided with means for holding a tool and an inner end provided with the transmission, the motor being between the ends.

3. The machining spindle drive defined in claim 1 wherein the planet carrier with its gears is axially movable between high-speed and low-speed end positions in the housing and the means includes;

teeth on the planet carrier and on the shaft axially engageable with each other only in the low-speed position; and teeth on the sun gear and on the spindle axially engageable with each other only in the high-speed position.

4. The machining spindle drive defined in claim 1 wherein the spindle has an outer end formed as a seat for a tool holder and provided with means for clamping the tool holder to the outer end.

5. A drive comprising:

a housing;

a machining spindle rotatable in the housing about an axis and adapted to carry a machine tool;

a motor in the housing having
- a stator fixed in the housing and surrounding the spindle, and
- a rotor rotatable about the axis relative to the housing and to the spindle and surrounding the spindle; and a gear transmission in the housing including
- a tubular sun gear rotatable on the spindle, formed with axially directed teeth, and rotationally directly coupled to the rotor,
- a planet carrier rotatable about the axis, axially displaceable on the spindle, formed with axially directed teeth, and carrying a plurality of planet gears meshable with the sun gear,
- respective axially spaced sets of teeth fixed on the spindle and meshable with the sun-gear teeth and with the planet-carrier teeth, and
- a ring gear rotatable in the housing and meshing with the planet gears, the planet carrier and its gears being jointly axially displaceable between a low-speed position with the sun gear meshing with the planet gears and the planet carrier coupled by its teeth to the respective set of teeth of the spindle for rotating the spindle at a rate slower than that of the rotor and a high-speed position with the sun gear out of mesh with the planet gears and directly coupled by its teeth to the respective set of teeth of the spindle for rotating the spindle jointly with the rotors.

* * * * *